United States Patent [19]

Engelse et al.

[11] Patent Number: 5,060,172

[45] Date of Patent: Oct. 22, 1991

[54] METHOD AND APPARATUS FOR DISPLAYING SMOOTH-SHADED OBJECTS

[75] Inventors: Willem Engelse, Townsend; Todd Comins, N. Chelmsford, both of Mass.

[73] Assignee: Digital Equipment Corporation, Maynard, Mass.

[21] Appl. No.: 376,450

[22] Filed: Jul. 6, 1989

[51] Int. Cl.[5] .................. G06F 15/62; G09G 1/16
[52] U.S. Cl. .................... 364/522; 364/521; 340/728; 340/729; 340/747
[58] Field of Search ............... 364/522, 521, 518, 745; 340/728, 729, 747

[56] References Cited

U.S. PATENT DOCUMENTS

| | | | |
|---|---|---|---|
| 4,354,243 | 10/1982 | Ryan et al. | 364/515 |
| 4,532,503 | 7/1985 | Pennebaker | 340/728 |
| 4,677,431 | 6/1987 | Lee | 340/728 |
| 4,704,605 | 11/1987 | Edelson | 340/728 |
| 4,709,231 | 11/1987 | Sakaibara et al. | 340/729 |
| 4,725,831 | 2/1988 | Coleman | 340/747 |
| 4,796,020 | 1/1989 | Budrikis et al. | 340/728 |
| 4,805,116 | 2/1989 | Liang et al. | 364/521 |
| 4,819,192 | 4/1989 | Kuragano et al. | 364/522 |
| 4,862,391 | 8/1989 | Ohhashi | 364/522 |
| 4,899,294 | 2/1990 | Easton et al. | 364/522 |
| 4,930,092 | 5/1990 | Reilly | 364/522 |

*Primary Examiner*—Gary V. Harkcom
*Assistant Examiner*—Raymond J. Bayerl
*Attorney, Agent, or Firm*—Cesari and McKenna

[57] ABSTRACT

Method and apparatus for rendering a smooth-shaded graphics primitive vertical series of horizontal pixel spans which extend between beginning and trailing edges of the primitive, the pixel locations being spaced from each other by selected distances dX and dY. The apparatus produces X and Y addresses of the first and last pixels in the beginning span of the primitive and the number of spans in the primitive. Also produced are step values (dX/dY) indicating the slopes of the beginning and trailing edges, and a beginning intensity value for the first pixel in the beginning span. DX is added to the X address of each pixel in each span to determine the X address of the next pixel in that span and one of the step values is added to the X address of the first pixel in each span to calculate the X address of the first pixel in the next span of the primitive. In addition, the other of the step values is added to the X address of the last pixel in each span of the primitive to calculate the X address of the last pixel in the next span of the primitive. The distance dY is added to the Y address of each span to calculate the Y address of the next span until the number of spans has been rendered. One or more intensity values is cumulatively added to the beginning intensity value to calculate the intensity value for the next pixel.

18 Claims, 3 Drawing Sheets

METHOD AND APPARATUS FOR DISPLAYING SMOOTH-SHADED OBJECTS

This invention relates to computer-aided graphics. It relates more particularly to method and means for calculating pixel intensities in smooth-shaded trapezoids and other drawing primitives.

BACKGROUND OF THE INVENTION

In computer-aided graphics, objects are often displayed as three-dimensional solids. In graphics systems suitable for high-end graphics applications, these solids may be smooth-shaded so that they appear more realistic and life-like. In other words, through the use of smooth shading, the intensity or color of the object can be varied over the object surface to enhance the three-dimensional appearance of the object. For example, the color or intensity values of the object may increase progressively proceeding from the left edge to the right edge of the object for shading purposes. A similar intensity variation may be present from the top to the bottom of the object.

In computer-aided graphics, a smooth-shaded object is composed of a multiplicity of smooth-shaded drawing primitives whose shapes are such that they can be arranged adjacent to one another to form the object. A commonly used drawing primitive is the trapezoid. Also used are the triangle and polygon, the former being a degenerate trapezoid whose top or bottom span is a single point and the latter being composed of a plurality of adjacent trapezoids. While the object being displayed may appear to be composed of curved surfaces, it is actually made up of a mosaic of facets consisting of drawing primitives, e.g. trapezoids. On surface areas of the object which are relatively flat, these trapezoids are relatively large. On the other hand, where the curvature of the object surface is more pronounced, the trapezoids forming those surfaces are correspondingly smaller. Often, thousands of smooth-shaded primitives have to be displayed in order to give the object a realistic three dimensional or solid appearance.

In a typical raster display, a trapezoid primitive is composed of horizontal scans of picture elements or pixels with the top span defining the top of the trapezoid, the bottom span defining the bottom of the trapezoid and with the beginnings and ends of those spans defining the non-parallel side edges of the trapezoid. The shading of each trapezoid being displayed is determined by the intensities of the pixels in the trapezoids. To provide smooth shading in a graphics system, the system CPU has to communicate with the graphics hardware in order to transfer the requisite information to the graphics hardware for rendering each drawing primitive.

In prior graphics work stations and systems of this general type, the communication between the system CPU and the graphics hardware occurs at a relatively low level. In early systems, the system's CPU had to transfer to the graphics hardware intensity information for each individual pixel of each smooth-shaded trapezoid or other primitive making up the object being displayed. Since this involves a transfer of a very large amount of information from the CPU to the graphics hardware, it took a relatively long time to display a smooth-shaded object. In later systems, the graphics hardware has been able to display an entire span of pixels from information provided by the CPU. In other words, for each span of the trapezoid, the display hardware is given a command to draw a span of pixels having a given length and starting with a given pixel intensity. Thus, for each span, the intensity of the first pixel in the span has to be calculated and transferred to the graphics hardware. Although such systems were an improvement over the earlier apparatus, they are still not fast enough for use in present day CAD CAM, CAE and other color graphics processing systems that are expected to produce high quality displays of solid objects in a minimum amount of time.

SUMMARY OF THE INVENTION

This invention provides a graphics processing system whose CPU is required to transfer to the system's graphics hardware only a minimum amount of information to enable the system to draw all of the smooth-shaded trapezoids or other drawing primitives required for the high quality display of smooth-shaded solid objects. The system is particularly suitable for image processing applications that require realtime high graphics performance at minimum cost.

Although the system calculates the intensities of the pixels in a smooth-shaded trapezoid or other drawing primitive in a minimum amount of time and with a minimum amount of drawing data being provided by the host CPU, it still avoids unwanted intensity discontinuities in the drawing of the smooth-shaded primitives.

The invention comprises the several steps and the relation of one or more of such steps with respect to each of the others, and the apparatus embodying the features of construction, combination of elements and arrangement of parts which are adapted to effect such steps, all as exemplified in the following detailed description, and the scope of the invention will be indicated in the claims.

Briefly, the present system draws smooth-shaded objects composed of a mosaic of smooth-shaded trapezoids. Each trapezoid is drawn as a succession of horizontal spans of picture elements (pixels) and the locations and color values of these pixels are stored in a frame buffer memory preferably in the same order as they will appear in the display.

By a hardware-assisted operation, the system may calculate the proper address in memory of each pixel in each span of the trapezoid from only six input parameters provided by the host CPU, namely the starting and ending X addresses of the first span of the trapezoid (X1 START, X2 START), the incremental values added to the starting and ending addresses of each span of the trapezoid to interpolate the starting and ending addresses of the next span (X1 STEP, X2 STEP), the starting Y address of the first span of the trapezoid (Y START) and the number of spans in the trapezoid (SPAN COUNT). The X1 START, X2 START and Y START data define the first, e.g., top, span of the trapezoid, the SPAN COUNT defines the trapezoid last, e.g., bottom, span and the X1 STEP and X2 STEP data determine the slopes of the two non-parallel edges of the trapezoid.

In certain cases, if the X1 STEP value is added to the beginning address of a trapezoid span to generate the beginning address of the next span, the first pixel of the latter span would overflow beyond the desired boundary of the trapezoid or overlap an adjacent subsequently drawn trapezoid. Accordingly, in those cases, the first pixel in that next span may be shifted along the span (X direction) so that boundary integrity is maintained and overlap is avoided. For this, the X START and X STEP values are written with integer and fractional parts. The two parts of those values are added separately when calculating the beginning address of the next span. The numbers may be truncated to negative infinity and only the integer part used to address the memory. However, the carry bit from the addition of the fractional parts may be used to effect a pixel intensity correction at the beginning of the next span to compensate for the aforesaid shift of the beginning address of that span to maintain the boundary integrity of the trapezoid.

Simultaneous with the pixel address calculations, the system preferably calculates the color value or intensity of each pixel in each smooth-shaded trapezoid to be drawn from only three input variables, namely the intensity of the first pixel in the first span of the trapezoid (START INTENSITY), the intensity step down the beginning edge of the trapezoid (EDGE STEP) and a second intensity correction (SPAN STEP) added to the EDGE STEP intensity correction when directed by the aforementioned carry bit to compensate for the fact that the beginning of a given trapezoid span is shifted in the X direction to prevent pixel overflow and overlap as discussed above.

The START INTENSITY and SPAN STEP data are usually provided by the host CPU; the EDGE STEP DATA may be calculated by the host CPU or by internal processor from intensity rate of change data in the X and Y directions (dI/dX, dI/dY) provided by the host CPU.

Following completion of a smooth-shaded trapezoid, if any of the aforesaid pixel position and intensity values are not changed, they may become the starting values for the next trapezoid in the mosaic comprising the object to be displayed. Usually, several if not most of these variables do remain the same from one trapezoid to the next so that only a minimum transfer of data from the host CPU is required to enable the system's graphics hardware to produce a high quality display of the entire smooth-shaded object. Thus the system is able to provide high graphics performance in real time at minimum cost.

DESCRIPTION OF THE PREFERRED EMBODIMENT

Figure 1:
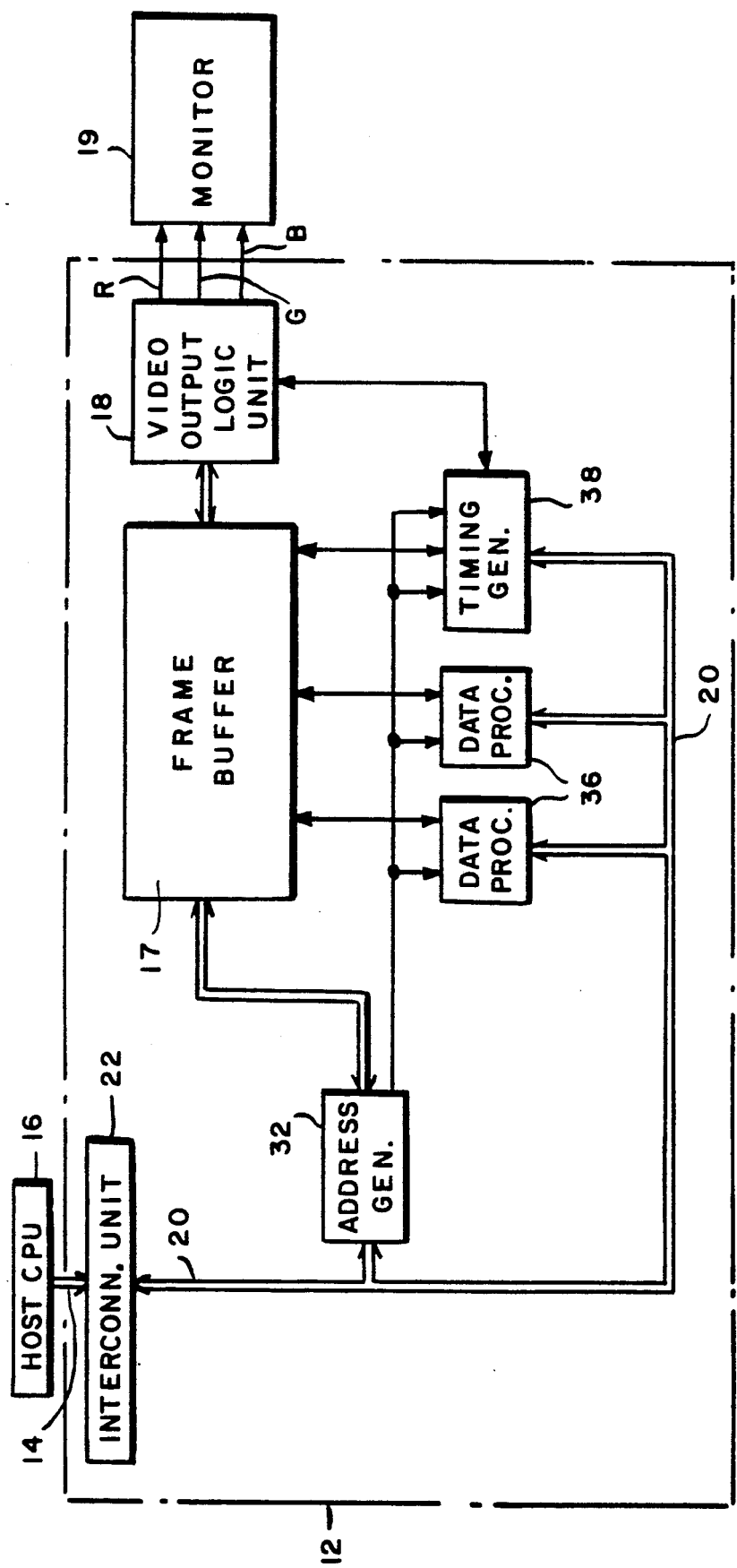
FIG. 1 is a block diagram showing a computer-aided graphics processing system incorporating this invention.

FIG. 1 of the drawings shows an image processing apparatus 10 having a graphics subsystem 12 incorporating the invention. To provide a setting for the invention, we will first give a general description of the overall apparatus. System 12 usually operates on a master node of a bus 14 and receives all of its data and commands from a host CPU 16 over that bus 14. System 12 interprets graphics commands and data read from the main memory of CPU 16 and generates pixel data, i.e., pixel address and color values, in a bit map memory 17 which functions as a frame buffer in system 12.

Data read from the frame buffer 17 may be applied to a video output logic unit 18 which, in turn, provides red (R), green (G) and blue (B) picture signals for enabling a conventional CRT monitor 19 to display smooth-shaded objects in color. In other words, system 12 computes the pixel addresses and color values for the smooth-shaded drawing primitives that make up the objects displayed on monitor 19. For purposes of this description, we will assume that the object being displayed is composed of smooth-shaded trapezoids. It should be understood however that aspects of the invention are equally applicable to systems for rendering other drawing primitives such as polygons and rectangles.

The graphics system 12 may include a local bus 20 and a bus interconnect unit 22 which performs all of the functions required for synchronous communication between the host bus 14 and local bus 20. All host requests for access to graphics system 12 via interconnect unit 22 may be routed through an address generator 32 in system 12 which serves as the local bus 20 arbiter.

The frame buffer 17 may store all the information required to control the display on the color monitor 19. Specifically, buffer 17 may store an address in a color look-up table (not shown) in video output logic unit 18 at which location in the may be stored the control signals to control the intensity or the color of each pixel displayed on the monitor. The frame buffer 17 may be controlled by one or more (two are shown) associated data processors 36 which manipulate the data in the buffer. The frame buffer 17 and the associated data processors 36 can be accessed via bus 20 by the host CPU 16 through the interconnect unit 22.

From the input data provided by the host CPU 16 and present on bus 20, system 12 can perform a hardware-assisted operation to compute the pixel addresses in frame buffer 17 and also the pixel color values (red, green, blue) to be stored at those addresses for the smooth-shaded trapezoids or other drawing primitives that make up the objects to be displayed on monitor 19. More specifically, the address generator 32 in system 12 defines the manner in which pixel data for drawing the smooth-shaded trapezoids are accessed in the frame buffer 17 and rendered by the graphics hardware. The data processors 36 in system 12 manipulate the data in frame buffer 17 to calculate the red, green and blue color values or numbers of the pixels comprising the trapezoids. That color data may be stored in the frame buffer 17 as it will appear on monitor 19 and may be read out of buffer 17 to video output logic unit 18 under the control of a timing generator 38. Video output logic unit 18 includes the aforementioned color look-up table addressed by the data in the frame buffer 17. The color data in the table may be converted to analog signals by conventional D/A converters and the analog signals applied to the three color guns of monitor 19 so that the monitor displays the smooth-shaded objects rendered by system 12.

Having provided an overview of the graphics processing apparatus, we will now described in greater detail the portions thereof incorporating the invention. These portions constitute sections of the address generator 32 and the data processors 36.

The two-dimensional addressing of pixel data in frame buffer 17 preferably uses a Cartesian coordinate system. In other words, buffer 17 has an X-axis with X increasing from left to right and a Y-axis with Y increasing from top to bottom.

In accordance with the present invention, each smooth-shaded trapezoid to be displayed may be defined as a two-dimensional array of pixel data in the shape of a trapezoid within the frame buffer 17. As mentioned previously, each horizontal line of pixels in that trapezoid is referred to as a span, while the non-parallel edges of the trapezoid are referred to as edges. Successive adjacent trapezoids form polygons, which are the building blocks of many graphic images. Also, as noted previously, a triangle may be considered as a trapezoid whose top or bottom span is a single pixel.

Figure 2:
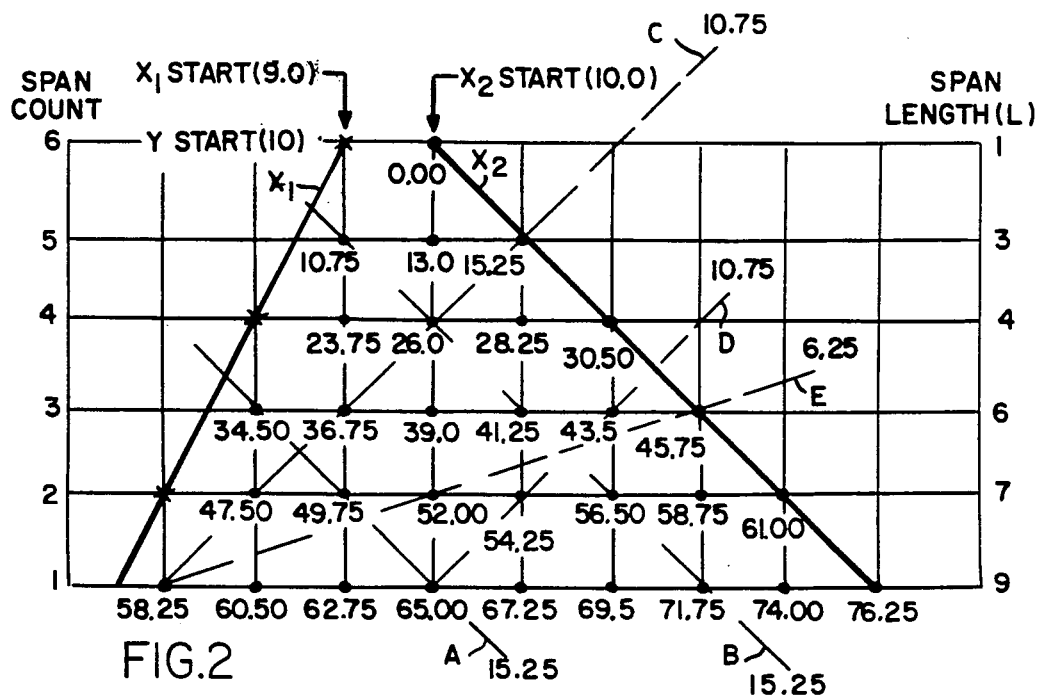
FIG. 2 is a diagram of a drawing primitive rendered by the FIG. 1 system.

As shown in FIG. 2, in accordance with this invention, the shape and location of each trapezoid may be defined by six parameters. More particularly, the first span of the trapezoid may be defined by the X and Y addresses of the first and last pixels of that span, referred to as X1 START and X2 START, and the Y address of those top span of pixels may be denominated Y START. X1 START always denotes the beginning of the first span. Thus, if spans are drawn from right to left (−X direction) X1 START would be located at the right edge of the trapezoid rather than at the left edge as shown in FIG. 2. Likewise, Y START is always the Y address of the first span of the trapezoid. If the trapezoid is being drawn bottom to top (i.e., −Y direction), Y START would be the address of the bottom span of the trapezoid. The last span of the trapezoid is obtained by adding to or subtracting from the Y START address the number of spans in the trapezoid. This number may be present as a count in a count register 32b of the address generator 32; see FIG. 3. The slopes of the desired beginning and ending edges X1 and X2 of the trapezoid are determined by incremental or step values added to the X coordinates that define the beginning and end of each span to calculate the starting and ending X addresses for the next span. In the present description, these increments are called X1 STEP and X2 STEP.

Figure 3:
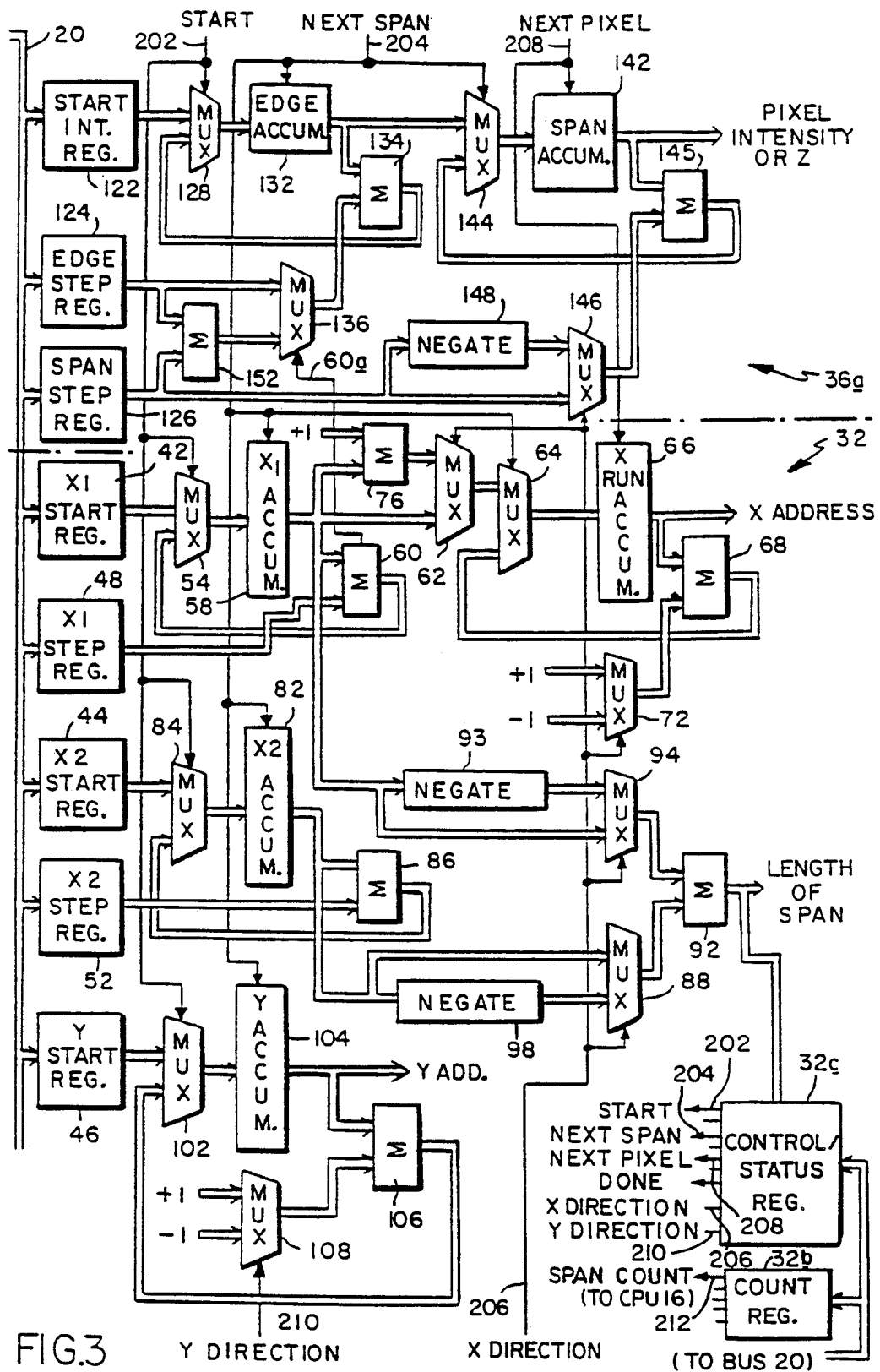
FIG. 3 is a block diagram showing certain sections of the FIG. 1 system in greater detail.

FIG. 3 of the drawings shows the section of the address generator 32 containing the X and Y logic for calculating the addresses to address the frame buffer 17. Address generator 32 may include a set of registers which receive, at the beginning of each hardware-assisted operation, five of the six trapezoid-defining parameters described above. Preferably these registers are double-buffered so that the next values can be loaded into the registers before the current operation is completed, the values loaded remaining unaffected by the operation. New data may be loaded into these registers via local bus 20 at the end of each hardware-assisted operation.

Thus, there is a register 42 which stores the X address of the pixel at the beginning of the first span of a trapezoid, i.e., X1 START; a register 44 which stores X2 START, the address of the last pixel in the first span of the trapezoid; a register 46 which stores Y START, the Y address of the first span of the trapezoid; a register 48 which stores the X address increment at the beginning of each span of the trapezoid, i.e., X1 STEP, and a register 52 that stores the X address increment at the end of each span of the trapezoid, i.e., X2 STEP. As noted previously, the sixth parameter, i.e., the number of spans in each trapezoid, is preferably maintained in the count register 32b of the address generator 32.

A hardware-assisted cycle may begin as soon as the count register 32b is written and may continue until that register decrements to zero, with the contents of the count register being decremented upon completion of each span of the trapezoid. In addition to register 32b, address generator 32 preferably includes a control/status register 32c. When a hardware-assisted operation begins, a DONE bit in the control/status register 32c is cleared. This bit remains clear until the entire hardware-assisted operation is completed, i.e., upon completion of a smooth-shaded trapezoid, at which point that bit is set.

The contents of the X1 START register 42 are applied to one input port of a multiplexer 54 whose output leads to an X1 accumulator 58. The contents of that accumulator are applied, in turn, to one input of an adder 60 whose output is routed back to the other input port of multiplexer 54. A second input for the adder 60 comes from the X1 STEP register 48. Preferably multiplexer 54 is selective. At the start of each hardware-assisted operation, a START signal on line 202 from control/status register 32c is applied to the multiplexer so that the X1 START address in register 42 is loaded into accumulator 58; otherwise, the accumulator receives the output of adder 60, which is the sum of the X1 START address of the first pixel in the first span of the trapezoid and the X1 STEP value, i.e., the amount by which the first pixel in the second span of the trapezoid is displaced to the right or to the left of the first pixel in the first span. This X1 STEP value determines the slope of the starting edge X1 of the trapezoid.

During the rendering of each trapezoid span, the contents of accumulator 58 remain the same. At the beginning of each span, a NEXT SPAN signal on line 204 from the control/status register 32c is applied to accumulator 58 so that the X1 STEP value in register 48 is added to the contents of accumulator 58 in adder 60 to produce the starting X address for the next span of the trapezoid.

Preferably, the X1 START addresses and the X1 STEP increments thereto are written in 2's complement notation with an integer part and a fractional part. The calculated address is then truncated to negative infinity (e.g. rounded down) and only the integer part is used. For example, 9.89 is truncated to 9.0 and −0.1 is truncated to −1.0. The integer part is then incremented by 1 to produce the actual number used to address the frame buffer 17. This procedure assures that the first pixel in a given span of the trapezoid is within the trapezoid beginning edge X1. More specifically, to avoid overflow beyond the boundaries of the trapezoid and overlap of adjacent trapezoids, adder 60 adds the integer and fractional portions of the numbers in register 48 and accumulator 58 separately as follows:

1) *current X1 fraction + X1 STEP fraction = next X1 fraction;*

2) *current X1 integer + X1 STEP integer = next X1 integer.*

Adder 60 may be considered as two adder sections one of which adds the fractions and the other of which adds the integers. Adding to the fraction of the accumulated value in accumulator 58 the fraction of the X1 STEP value in register 48 may or may not result in a carry into the integer adder section depending upon the magnitudes of the fractions. However, only the integer portion of the starting X address accumulation is actually applied to address the frame buffer 17. But, as we shall see later, the carry bit from the addition of the fractions in adder 60, which appears on an adder output line 60a, is used by the data processors 36 to maintain pixel intensity interpolation accuracy when address corrections are made to ensure that the drawn pixels stay within the trapezoid boundaries as described above.

The contents of accumulator 58 are preferably also applied to a multiplexer 62 and to an adder 76 which also receives a +1 input to increment those contents as noted above. The output of adder 76 is fed to the other input of multiplexer 62. Multiplexer 62 is controlled by a X DIRECTION bit on line 206 from control status register 32c. When a trapezoid is being written from left to right (+X direction), the bit from register 32c is a ZERO and the multiplexer 62 applies the output of adder 76, i.e., the contents of accumulator 58 plus 1 to multiplexer 64. On the other hand, when the figure is being written from right to left (−X direction), the multiplexer 62, in response to a X DIRECTION bit of ONE from control/status register 32c, applies just the contents of accumulator 58 to multiplexer 64.

The output of multiplexer 64 leads to a X run accumulator 66, the contents of which represent the X address of a location in the frame buffer 17. Multiplexer 64 receives NEXT SPAN signals so that at the beginning of each span, it passes the starting X address present at multiplexer 62 to accumulator 66.

To produce the X coordinates of the frame buffer 17 locations required to display the successive pixels in a given span of the trapezoid, the contents of accumulator 66 are applied to an adder 68 which also receives either a +1 or −1 by way of a multiplexer 72. The output of adder 68 is routed back to a second input of multiplexer 64. Accumulator 66 receives NEXT PIXEL signals on line 208 from control/status register 32c and upon the occurrence of each such signal, the contents of the accumulator 66 is incremented or decremented by 1, depending upon the status of multiplexer 72, to develop the X addresses of the successive pixels in a span of the trapezoid. Multiplexer 72 is controlled by the above-mentioned X DIRECTION bit from control/status register 32c. When a trapezoid is being written from left to right, the multiplexer 72 applies its +1 input to the adder 68. On the other hand, when the figure is being written from right to left, the multiplexer applies the −1 input to adder 68.

As noted previously, the successive numbers in accumulator 66 constitute the X addresses in the frame buffer 17 memory of the pixels in the various spans of the trapezoid to be displayed.

Still referring to FIG. 3, the address generator 32 may also contain somewhat similar logic for defining the opposite or trailing side edge X2 of each trapezoid to be displayed. At the beginning of each hardware-assisted operation, the X coordinate of the last pixel in the first span of the trapezoid, i.e., X2 START, is stored in register 44. Also, the increment which determines the slope of that edge, i.e., X2 STEP, is present in register 52. The contents of register 44 are applied to a X2 accumulator 82 by way of a multiplexer 84 controlled by START signals from the control/status register 32c. At the beginning of each hardware-assisted operation, a START signal loads the contents of register 44 into accumulator 82 which also receives NEXT SPAN signals from the control/status register 32c. Upon the occurrence of each NEXT SPAN signal, the contents of the register 52 are added to the contents of accumulator 82 in an adder 86, with the sum being loaded into the accumulator 82 via multiplexer 84. Accordingly, the X2 STEP value is added to the number in accumulator 82 to calculate the X coordinate of the last pixel in the next span of the trapezoid.

That ending X address in accumulator 82 may also be applied by way of a multiplexer 88 to an adder 92. The other input for that adder comes from accumulator 58 described above. The contents of that accumulator 58, i.e., the starting X address (integer only), is applied via a negate circuit 93 to a multiplexer 94 whose output leads to adder 92. When the system is writing from left to right, multiplexers 88 and 94 pass the ending X address and the negative of the starting X address, respectively. Accordingly, adder 92 adds these values so that the contents of adder 92 represents the length of a trapezoid span drawn from left to right, i.e., X2−X1. Since the spans may also be drawn from right to left as noted above, the output of accumulator 58 may also be applied to multiplexer 94 and the output of accumulator 82 fed to multiplexer 88 by way of a negate circuit 93. When drawing right to left, multiplexers 88 and 94 receive the X DIRECTION bit of ONE from the control/status register 32c so that adder 92 effectively subtracts the ending address X2 from the starting address X1.

As described above, NEXT SPAN signals are preferably issued by register 32c prior to the beginnings of the trapezoid spans and the number in adder 92 represents the length of each span. Therefore, that number is applied to control/status register 32c which counts NEXT PIXEL signals. After the requisite number of such signals register 32c issues a NEXT SPAN signal.

The logic for calculating the Y coordinates of the buffer 17 memory locations is much simpler. As shown in FIG. 3, a Y START coordinate is present in the register 46 at the beginning of each hardware-assisted operation. Unlike the X1 and X2 START addresses, this address may be an unsigned integer which does not have a fractional part. The contents of register 46 are preferably applied by way of a multiplexer 102 to a Y accumulator 104 and the contents of that accumulator constitute the Y address for addressing frame buffer 17. A START signal applied to multiplexer 102 loads the Y START address into accumulator 104. That accumulator may also receive NEXT SPAN signals from register 32c and upon the occurrence of each such signal, an adder 106 increments or decrements the contents of accumulator 104 depending upon the status of a multiplexer 108 having +1 and −1 inputs and controlled by a Y DIRECTION bit on line 210 from the control/status register 32c. Thus, following the completion of each span, the Y address in accumulator 104 may be decremented (if writing from the top down) or incremented (if writing from the bottom up) by one unit to draw each succeeding span of the trapezoid until the final span is drawn.

As noted previously, the count register 32b in address generator 32 preferably decrements after each trapezoid span is rendered. This is done until the count register reaches zero marking the completion of the trapezoid and the end of the hardware-assisted operation. If, after all spans have been processed from a previous hardware-assisted operation, no new value has been loaded into any of the X1 START, X2 START and the Y START registers 42, 44 and 46, respectively, at the start of the next hardware-assisted operation, the values stored in the corresponding accumulators 58, 82 and 104, respectively, can be used as the starting addresses for the next trapezoid to be displayed. Similarly, if no new step values are loaded into registers 48 and 52, the step values stored therein from the previous operation may be used when rendering the next trapezoid.

Table I herein shows the contents of the accumulators 58, 66, 82 and 104 in address generator 32 as the address generator calculates the addresses in frame buffer 17 for rendering the smooth-shaded trapezoid depicted in FIG. 2. In this example, the arbitrarily selected starting parameters for that primitive loaded into the various registers 42, 48, 44, 52, 46 and 32c at the beginning of the operation are as follows:

X1 START = −9.0
X1 STEP = 0.5
X2 START = 10.0
X2 STEP = +1.0
Y START = 10
SPAN COUNT = 6 present at adder 92 and used, as noted above, to initiate a NEXT SPAN signal from control/status register 32 after the requisite number of NEXT PIXEL signals for that span. Thus in the case of the top span of the trapezoid in FIG. 2 having starting and ending X addresses of 9 and 10, respectively, register 32c emits a NEXT SPAN signal after counting one NEXT PIXEL signal so that the top span consists of the single pixel at addresses X = 10; Y = 10. Following completion of the top span, the span count is decremented to 5.

In response to that NEXT SPAN signal, the contents of the Y STEP accumulator 104 is incremented by 1 so that the Y address for the second span becomes 11. Also, the X1 STEP value of −0.5 is added by adder 60

TABLE I

| Span Count Reg. 32c | Y Acc. 104 | X1 Acc. 58 | X2 Acc. 82 | Xrun Acc. 66 | Span Length Add. 92 | Pixel Intens. Acc. 142 | Intensity | Interpolation | Events | |
|---|---|---|---|---|---|---|---|---|---|---|
| | | | | | | | EdgeAcc = | StartIntReg | | |
| 6 | 10 | 9.0 | 10.0 | 10 | 1 | 0.0 | SpanAcc = | EdgeAcc | | |
| | | | | | | | EdgeAcc = | EdgeAcc + | Edgestep | |
| 5 | 11 | 8.5 | 11.0 | 9 | | 10.75 | SpanAcc = | EdgeAcc | | |
| 5 | 11 | 8.5 | 11.0 | 10 | | 13.00 | SpanAcc = | SpanAcc + | SpanStep | |
| 5 | 11 | 8.5 | 11.0 | 11 | 3 | 15.25 | SpanAcc = | SpanAcc + | SpanStep | |
| | | | | | | | EdgeAcc = | EdgeAcc + | EdgeStep + | SpanStep |
| 4 | 12 | 8.0 | 12.0 | 9 | | 23.75 | SpanAcc = | EdgeAcc | | |
| 4 | 12 | 8.0 | 12.0 | 10 | | 26.00 | SpanAcc = | SpanAcc + | SpanStep | |
| 4 | 12 | 8.0 | 12.0 | 11 | | 28.25 | SpanAcc = | SpanAcc | SpanStep | |
| 4 | 12 | 8.0 | 12.0 | 12 | 4 | 30.50 | SpanAcc = | SpanAcc + | SpanStep | |
| | | | | | | | EdgeAcc = | EdgeAcc + | EdgeStep | |
| 3 | 13 | 7.5 | 13.0 | 8 | | 34.50 | SpanAcc = | EdgeAcc | | |
| 3 | 13 | 7.5 | 13.0 | 9 | | 36.75 | SpanAcc = | SpanAcc + | SpanStep | |
| 3 | 13 | 7.5 | 13.0 | 10 | | 39.00 | SpanAcc = | SpanAcc + | SpanStep | |
| 3 | 13 | 7.5 | 13.0 | 11 | | 41.25 | SpanAcc = | SpanAcc + | SpanStep | |
| 3 | 13 | 7.5 | 13.0 | 12 | | 43.50 | SpanAcc = | SpanAcc + | SpanStep | |
| 3 | 13 | 7.5 | 13.0 | 13 | 6 | 45.75 | SpanAcc = | SpanAcc + | SpanStep | |
| | | | | | | | EdgeAcc = | EdgeAcc + | EdgeStep + | SpanStep |
| 2 | 14 | 7.0 | 14.0 | 8 | | 47.50 | SpanAcc = | EdgeAcc | | |
| 2 | 14 | 7.0 | 14.0 | 9 | | 49.75 | SpanAcc = | SpanAcc + | SpanStep | |
| 2 | 14 | 7.0 | 14.0 | 10 | | 52.00 | SpanAcc = | SpanAcc + | SpanStep | |
| 2 | 14 | 7.0 | 14.0 | 11 | | 54.25 | SpanAcc = | SpanAcc + | SpanStep | |
| 2 | 14 | 7.0 | 14.0 | 12 | | 56.50 | SpanAcc = | SpanAcc + | SpanStep | |
| 2 | 14 | 7.0 | 14.0 | 13 | | 58.75 | SpanAcc = | SpanAcc + | SpanStep | |
| 2 | 14 | 7.0 | 14.0 | 14 | 7 | 61.00 | SpanAcc = | SpanAcc + | SpanStep | |
| | | | | | | | EdgeAcc = | EdgeAcc + | EdgeStep | |
| 1 | 15 | 6.5 | 15.0 | 7 | | 58.25 | SpanAcc = | EdgeAcc | | |
| 1 | 15 | 6.5 | 15.0 | 8 | | 60.50 | SpanAcc = | SpanAcc + | SpanStep | |
| 1 | 15 | 6.5 | 15.0 | 9 | | 62.75 | SpanAcc = | SpanAcc + | SpanStep | |
| 1 | 15 | 6.5 | 15.0 | 10 | | 65.00 | SpanAcc = | SpanAcc + | SpanStep | |
| 1 | 15 | 6.5 | 15.0 | 11 | | 67.25 | SpanAcc = | SpanAcc + | SpanStep | |
| 1 | 15 | 6.5 | 15.0 | 12 | | 69.50 | SpanAcc = | SpanAcc + | SpanStep | |
| 1 | 15 | 6.5 | 15.0 | 13 | | 71.75 | SpanAcc = | SpanAcc + | SpanStep | |
| 1 | 15 | 6.5 | 15.0 | 14 | | 74.00 | SpanAcc = | SpanAcc + | SpanStep | |
| 1 | 15 | 6.5 | 15.0 | 15 | 9 | 76.25 | SpanAcc = | SpanAcc + | SpanStep | |

From Table I, it is seen that the address in the X1 accumulator 58 and the X2 accumulator 82 and the Y accumulator 104 remain the same for each span of the trapezoid being rendered. Upon the occurrence of a START pulse at the beginning of the operation, (NEXT SPAN and NEXT PIXEL signals are also present at START), the X1, X2 and Y START values of 9.0, 10.0 and 10, respectively, are latched to those accumulators. The X1 START value, i.e., 9, is incremented by 1 at adder 76 and the integer portion of the sum fed by multiplexers 62 and 64 to accumulator 66. The accumulator 66 contents, i.e., 10, becomes the X address of the first pixel in the top span of the trapezoid.

To generate the addresses of the remaining pixels in a given span of the trapezoid, the contents of the X run accumulator 66 are incremented by 1 at adder 68 in response to successive NEXT PIXEL signals from control/status register 32c. The number of such signals generated for a particular span depends upon the span length, i.e. X2−X1 in this example. This number is to the contents of the X1 accumulator 58 (i.e., 9.0) which thus becomes 8.5. As noted previously, the fractional and integer portions of those two numbers are added separately and the sum is truncated to negative infinity, i.e. to 8.0. The integer portion of that number is then incremented by 1 at adder 76 so that a 9 is piped by multiplexer 64 to X run accumulator 66 and becomes the starting X address of the second span of the trapezoid. The addition of the fractional part of the X1 STEP number to the contents of X1 accumulator 58 at adder 60 may or may not result in a carry to the integer portion; it did not in this case. This CARRY BIT is delivered via line 60a from adder 60 to the data processors 36. As will be described in detail shortly, this bit is used to control the starting intensities of selected spans of the trapezoids to compensate for the fact that the first pixel in those spans has been shifted to maintain the spans within the trapezoid boundaries.

After the starting X address for the second span (i.e., 9) has been latched to the X run accumulator 66, the contents of that accumulator are incremented by successive +1 values at adder 68 in response to NEXT PIXEL signals to produce the X addresses for the remaining pixels in the second span (i.e., X=10, 11).

When the NEXT SPAN signal that initiated the second span occurred, the X2 START value (i.e., 10.0) in the X2 accumulator 82 was incremented by the X2 STEP number (i.e., +1.0) present in register 52 so that the ending address of the second span became 11.0, i.e., it ends one unit to the right of the first span. The span length at adder 92, i.e., X2−X1 Trunc (11.0−8.0) became 3 so that register 32c issues another NEXT SPAN signal after three NEXT PIXEL signals.

After completion of the second span, the span count in register 32b is decremented to 4 and, upon the occurrence of that just-mentioned NEXT SPAN signal, the number in the X2 accumulator 82 (i.e., 11.0) is incremented to 12 which becomes the ending X address for the next or third span. The contents of the Y accumulator are also incremented by 1 so that the Y address of the third span becomes 12. In addition, the X1 STEP value (−0.5) is again added to the contents of the X1 accumulator 58 (now 8.5), so that the number in that accumulator becomes 8.0. Upon the occurrence of the first NEXT PIXEL signal, the integer portion of the accumulator 58 contents (i.e., 8) is incremented by 1 at adder 76 and loaded into X RUN accumulator 66 so that 9 becomes the starting X address of the third span. It should be noted that the addition of the fractional parts of the accumulator 58 contents and X1 STEP (i.e., 0.5+0.5) produces a carry into the integer portion of the sum so that a CARRY BIT is present on line 60a at the beginning of the third span.

Thereafter, the contents of X run accumulator 66 are incremented at adder 68 by successive NEXT PIXEL signals to develop the X addresses for the remaining pixels in the third span, i.e., X=10, 11, 12. The span length $X2-X1=4$ is present at the output of adder 92 so that the third span is completed after four NEXT PIXEL signals, whereupon register 32c issues a NEXT SPAN signal.

Upon the occurrence of that signal marking the completion of the third span, the SPAN COUNT on line 212 in register 32c is decremented to 3, the ending address in X2 accumulator 82 is incremented to 13.0, the Y address in accumulator 104 is incremented to 13 and the number in the X1 accumulator 58 becomes 7.5 (i.e., 8.0−0.5). That number is truncated to 7.0 and the integer portion of that number is incremented by 1 at adder 76 so that the starting X address for the fourth span piped to the X run accumulator 66 is 8. Note that the addition of the fractional parts of the numbers that were added (i.e., 8.0−0.5) produce no CARRY BIT on line 60a. Successive NEXT PIXEL signals result in the contents of X run accumulator 66 being incremented at adder 68 to produce the X addresses of the five remaining pixels in the fourth span.

This process may continue with the address generator 32 calculating the X and Y addresses of the pixels in the remaining spans of the trapezoid as shown in the fifth and second columns of Table I, the beginning and ending address of the bottom span being 7,15 and 15,15, respectively. A CARRY BIT is produced on line 60a at the beginning of the third and fifth spans; there is no CARRY BIT at the beginning of the second, forth and sixth spans. The hardware-assisted operation ends upon completion of the sixth or bottom span of the trapezoid, after all the pixels in the bottom span have been rendered and the span count in register 32b has decremented to zero. At this point, new values can be loaded into one or more of the registers 32b and 42 to 52. If, after completion of the trapezoid, no new values have been loaded into those registers, the values stored in accumulators 58, 84 and 104 may be used as the starting and ending addresses for the first span of the next trapezoid to be rendered. Likewise, the same span count and X and Y steps may be used.

If the trapezoid were being written from right to left (−X direction) rather than left to right as just discussed, the X DIRECTION signal applied to the multiplexer 62 would cause that multiplexer to pipe the contents of X1 accumulator 58 directly to multiplexer 64 so that the accumulator contents would not be incremented by 1 at the beginning of each span. Also, the X DIRECTION signal applied to multiplexer 72 would result in the contents of accumulator 66 being decremented by each NEXT PIXEL signal. In addition, that same signal to multiplexers 88 and 94 would result in a span length at adder 92 of X1−X2. In any event, the resulting trapezoid would look exactly like the one in FIG. 2.

Still referring to FIG. 3, while the address generator 32 generates the X and Y addresses in frame buffer 17 of each pixel in the smooth-shaded trapezoid being rendered as just described, the data processors 36, or more particularly linear interpolator sections in those processors, may calculate the color values of those pixels and, in some applications, may also calculate the Z coordinate values of those pixels. There is preferably a separate interpolator section for each color (and for Z) and they may operate in parallel. One of these interpolators, e.g. the one for the color red, is shown at 36a in FIG. 3. Similar sections (not shown) may calculate the intensity values for the colors green and blue and, if applicable, the Z coordinate values for the pixels.

In the present system, there are three variables that influence the pixel color or intensity values when rendering a smooth-shaded trapezoid, namely, START INTENSITY, EDGE STEP and SPAN STEP, all of which are preferably supplied to the data processors 36 via local bus 20. START INTENSITY is the intensity value of the first pixel in the first span of the trapezoid being rendered. The EDGE STEP is an intensity increment that may be added to the intensity at the beginning of each span to produce the beginning intensity for the next span of the trapezoid. This increment, denominated dI/dE, is an increment in the direction of the beginning edge X1 of the trapezoid to the nearest integral pixel location on, or to the left of, that edge X1. More specifically, $$EDGE\ STEP = X1\ STEP\ Trunc \cdot (dI/dX) + ((Y\ dir.) \cdot (dI/dY)) \quad (1)$$

where:

Y dir.=+1 if trapezoid rendered top to bottom; −1 if rendered bottom to top, dI/dX=intensity step in X direction, dI/dY=intensity step in Y direction, X1 STEP=X coordinate increment for beginning edge X1, and Trunc is the function discussed above that truncates to negative infinity (e.g., rounds down) a number consisting of an integer part and a fractional part. Thus, if X1 STEP is 5.5, X1 STEP Trunc=5.0; if X1 STEP is −0.5, X1 STEP Trunc=−1.0.

The EDGE STEP, value (i.e. for the color red) may be applied via bus 20 (FIG. 1) to interpolator section 36a and that section adds that increment to the intensity of the first pixel of each span of the trapezoid to produce the starting intensity for the beginning of the next span of the trapezoid.

The SPAN STEP is an intensity correction in the X direction, i.e. dI/dX, that is added to the EDGE STEP increment in section 36a to compensate for the shift along the X axis of the first pixel in certain spans of the trapezoid to prevent overlap of adjacent trapezoids. In other words, the present system draws a figure composed of a mosaic of adjacent trapezoids. To avoid overlapping these trapezoids, the system may not render the pixels at the beginning edge X1 and top of the trapezoid. Then, when a second trapezoid is drawn adjacent to the first one, the trailing edge (or bottom span) of the second trapezoid can also complete the beginning edge (or top span) of the first trapezoid.

Figure 4:
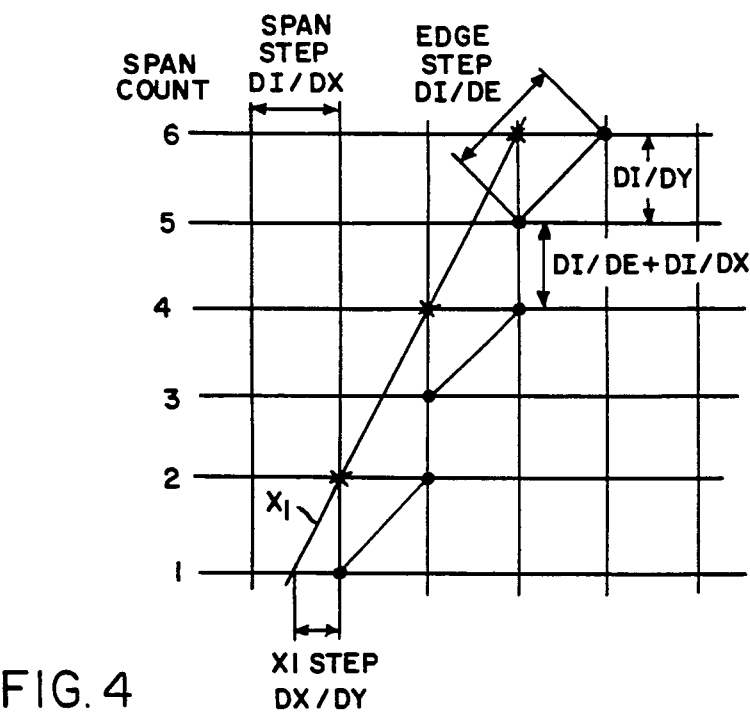
FIG. 4 is a diagrammatic view illustrating the operation of the FIG. 1 system.

FIG. 4 shows in, greater detail the pixels at the beginning edge margin of the smooth-shaded trapezoid depicted in FIG. 2 and the relationship between the EDGE STEP (dI/dE), SPAN STEP (dI/dX), X1 STEP (dX/dY) and dI/dY variables just described. In this example, SPAN STEP (dI/dX)=2.25; X1 STEP (dX/dY)=−0.5.; dI/dY=13.0 and EDGE STEP (dI/dE), calculated in accordance with Equation 1 above, is 10.75.

As shown in FIGS. 2 and 4, when writing from left to right, for the spans in which the addition of the X1 STEP value to the beginning address of the previous span, as described above, resulted in an X coordinate number less than one unit to the left of the beginning edge, X1 of the trapezoid, the incrementing of that number by 1 at adder 76 resulted in a beginning X address inside the trapezoid edge X1. The second, fourth and sixth spans are in this group. As noted above, at the beginnings of these spans no CARRY BIT was produced on line 60a of adder 60. As seen from FIG. 4, at the beginnings of these spans, only the EDGE STEP intensity increment is added to the beginning intensity of the previous span to produce the beginning intensities for these spans. As noted above, in the FIG. 2 example, this EDGE STEP increment is 10.75.

On the other hand, in the case of those spans in which the addition of the X1 STEP value to the beginning address of the previous span produced a X coordinate number on the trapezoid edge X1, that number is still incremented by 1 at adder 76 so that no pixels on the edge X1 are drawn to avoid overlap with an adjacent trapezoid as noted above. The third, fifth (and first) spans are in this category. As described above, there is a CARRY BIT produced on line 60a at the beginning of these spans and this bit is used to control interpolator 36a so that for these spans, not only the EDGE STEP increment, but also a SPAN STEP intensity correction is added to the beginning intensities of the previous spans to calculate the beginning intensities of these spans. Thus in the FIG. 2 trapezoid, the intensity corrections at the beginnings of the third and fifth spans is $dI/dE + dI/dX = 13.0$.

The ultimate objective is to calculate intensities for the various pixels in the trapezoid such that the intensity change from pixel to pixel in a given direction through the trapezoid is constant. Thus as shown in the FIG. 2 trapezoid, the intensity change from pixel to pixel in the vertical direction, i.e., dI/dY is 13.0; in the horizontal direction, i.e., dI/dX, it is 2.25; in the direction of lines A and B, it is 15.25; in the direction of lines C and D, it is 10.75; in the direction of line E, it is 6.25, etc. The present system, and particularly interpolator 36a, is able to effect these intensity corrections with minimal or no discontinuities.

Referring to FIG. 3, interpolator 36a includes three registers 122, 124 and 126, preferably double buffered, for storing the START INTENSITY, EDGE STEP and SPAN STEP variables just described. These values may be loaded into those registers prior to the beginning of each hardware-assisted operation. The contents of register 122 are applied by way of a multiplexer 128 to an edge accumulator 132. Multiplexer 128 receives START signals from the control/status register 32c so that at the beginning of each operation, the register 122 contents may be loaded into accumulator 132. Accumulator 132 is controlled by NEXT SPAN signals and applies its output to an adder 134 which also receives the number in the edge step register 124 by way of a multiplexer 136 controlled by the CARRY BIT on line 60a from adder 60. The output of adder 134 is routed back to a second input of multiplexer 128.

The contents of edge accumulator 132 are preferably also piped to a span accumulator 142 by way of a multiplexer 144 controlled by NEXT SPAN signals from control/status register 32c. The output of the span accumulator 142 constitutes the output of interpolator 36a as a whole. The contents of that accumulator 142 are desirably also applied to an adder 145 which receives, via a multiplexer 146, the SPAN STEP value present in SPAN STEP register 126. The number in the span step register 126 may also be applied to multiplexer 146 by way of a negate circuit 148. This is because the SPAN STEP value from register 126 is preferably always positive. When the system is drawing spans from right to left (i.e. −X direction) multiplexer 146 may receive a X DIRECTION signal from control/status register 32c so that the negative of the SPAN STEP number is added at adder 145 to the intensity value in accumulator 142.

The span accumulator 142 preferably writes data upon receiving NEXT PIXEL signals from control/status register 32c. Upon the occurrence of each such signal, the SPAN STEP number in register 126 may be added to the contents of accumulator 142 at adder 145 so that the intensities (red) of the successive pixels in a given span of the trapezoid being rendered appear at the output of span accumulator 142, which is the output of interpolator 36a as a whole.

As mentioned previously, in order to compensate for the X axis shift of the first pixel, to avoid overlap at the beginning edge X1 of the trapezoid, the SPAN STEP correction is added to the EDGE STEP value and the sum of those numbers is added to the intensity value in accumulator 132 prior to the beginnings of these spans. More particularly, the contents of the edge step register 124 and the span step register 126 are applied to an adder 152 whose output is coupled to a second input of adder 134 by way of multiplexer 136. Multiplexer 136 normally passes the input from edge step register 124. However, when the multiplexer receives a CARRY BIT on line 60a from adder 60 in address generator 36, indicating a carry of the X address fraction accumulation at the beginning of a given span as described above, the SPAN STEP correction, as well as the EDGE STEP increment, may be added to the intensity value in edge accumulator 132 denoting the beginning intensity for that span. As noted above, there is a CARRY BIT present on line 60a at the beginnings of the third and fourth spans of the FIG. 2 trapezoid.

Table I herein shows for the trapezoid depicted in FIG. 2, the pixel intensities calculated by, and intensity interpolation events carried out in, interpolator 36a as the address generator 32 calculates the pixel addresses. In this example, the arbitrary starting values loaded into registers 122, 124 and 126 of section 36a prior to the beginning of the hardware-assisted operation are as follows:

START INTENSITY=0.0
EDGE STEP=10.75
SPAN STEP=2.25

Intensity interpolation is initiated by a START signal to multiplexer 128 which loads the START INTENSITY value (i.e., 0.0) into edge accumulator 132. Since NEXT SPAN and NEXT PIXEL signals are also present at START, the intensity value 0.0 is latched via multiplexer 144 to span accumulator 142 and becomes the intensity of the first and only pixel in the top span of the trapezoid as shown in Table I and FIG. 2. The NEXT SPAN signal at the beginning of the second span results in the EDGE STEP value (i.e., 10.75) being added at adder 134 to the contents of register 132, (i.e., 0.0) so that accumulator 132 contains the number 10.75. Note that there is no CARRY BIT on line 60a at that time so that the SPAN STEP correction is not made at this point. The number in accumulator 132 (i.e., 10.75) is piped to span accumulator 142 so that 10.75 becomes the intensity of the first pixel of the second span of the trapezoid. Two successive NEXT PIXEL signals cause the accumulator 142 contents to be incremented twice by the SPAN STEP value (i.e., 2.25) at adder 145 to produce the intensity values 13.0 and 15.25 for the remaining two pixels of the second span as shown in Table I and FIG. 2.

The NEXT SPAN signal at the beginning of the third span also results in the contents of accumulator 132 (i.e., 10.75) being incremented not only by the EDGE STEP value 10.75, but also by the SPAN STEP correction 2.25 because of the presence of a CARRY BIT on line 60a to multiplexer 136. Thus edge accumulator 132 now contains the number 10.75+10.75+2.25=23.75. This number is applied to accumulator 142 and becomes the intensity of the first pixel in the third span of the trapezoid. Successive NEXT PIXEL signals to accumulator 142 increment the number in that accumulator by the SPAN STEP value 2.25 to produce the intensities for the remaining three pixels of the third span as shown in Table I and FIG. 2.

At the beginning of the fourth span, only the EDGE STEP increment 10.75 is added to the contents of accumulator 132 (i.e., 23.75) because no CARRY BIT is present on line 60a. Resultantly, at the beginning of the fourth span, the accumulator 132 contains the number 34.50 and this number is piped to accumulator 142 to become the intensity of the first pixel in the fourth span as shown in Table I and FIG. 2.

This process continues as the remaining spans of the trapezoid are rendered with the interpolator 36a providing the (red) intensity values for the remaining pixels to complete the red component of smooth-shaded trapezoid shown in FIG. 2. In this example, as seen from Table I and FIG. 2, the SPAN STEP, in addition to the EDGE STEP, is added to the contents of the edge accumulator 132 every other span.

After the last or bottom span of the trapezoid has been rendered, the SPAN COUNT in the count register 32b will have decremented to 0, marking the end of the hardware-assisted operation that draws the smooth-shaded trapezoid depicted in FIG. 2. If, after completion of the trapezoid, no new values are loaded into registers 122, 124 and 126, the intensity value in edge accumulator 132 is the starting edge intensity value for the next trapezoid to be drawn and the EDGE and SPAN STEP corrections remain the same.

If the trapezoid is being rendered from right to left (−X direction), the X DIRECTION signal is applied to multiplexer 146 so that the negative of the SPAN STEP value is added to the intensity of the first and succeeding pixels in each span to produce the intensity values for the remaining pixels in that span. The result is an intensity profile or map identical to the one shown in FIG. 2.

Similar interpolators calculate the green and blue intensity values for all of the pixels in the trapezoid and as shown in FIG. 1 these color values are all written into the frame buffer 17 at the addresses therein corresponding to these pixels. The color data for a multiplicity of such trapezoids are read out of the frame buffer under the control of logic unit 18 to display the smooth-shaded object on the monitor 19 shown in FIG. 1.

Certain changes may be made in carrying out the above method and in the construction set forth without departing from the scope of the invention. Therefore, it is intended that all matter contained in the above description or shown in the accompanying drawings shall be interpreted as illustrative and not in a limiting sense.

It is also to be understood that the following claims are intended to cover all of the generic and specific features of the invention herein described.

We claim:

1. A method of rendering a smooth-shaded graphics primitive composed of a series extending in a Y direction of pixel spans which extend in a X direction between opposite beginning and trailing edges of the primitive, the permitted pixel locations being spaced from each other in the X direction by a selected distance dX and in the Y direction by a selected distance dY, said method comprising the steps of:

producing selected X and Y addresses of the first and last pixels in the beginning span of the primitive and a selected number indicating the number of spans in the primitive;

producing X1 step and X2 step values (dX/dY) indicating the slopes of said beginning and trailing edges, respectively;

producing a beginning intensity value for the first pixel in the beginning span of the primitive;

adding the selected distance dX to the X address of each pixel in each span to determine the X address of the next pixel in that span;

adding one of said X1 and X2 step values to the X address of the first pixel in each span of the primitive and changing the resulting number to the nearest pixel location within said edges of the primitive to calculate the X address of the first pixel in the next span of the trapezoid;

adding the other of said X1 and X2 step values to the X address of the last pixel in each span of the primitive to calculate the X address of the last pixel in the next span of the primitive;

determining the number of pixels in each span from the X addresses of the first and last pixels in each span and after the determined number of pixels has been rendered, adding the selected distance dY to the Y address of each span to calculate the Y address of the next span of the primitive until the selected number of spans has been rendered; and adding one or more intensity values to said beginning intensity value to calculate the intensity value for a next pixel to be rendered in a given row, and successively adding a selected one of said intensity values to said next pixel rendered to calculate the intensity value of a successive pixel to be rendered in that row so as to produce a substantially constant intensity change from pixel to pixel in any given direction through the primitive.

2. The method defined in claim 1
wherein the spans are rendered in the $+X$ direction and said resulting number changing step is accomplished by truncating said resulting number to negative infinity; and
including the additional step of incrementing said truncated resulting number by said selected distance dX.

3. The method defined in claim 1 wherein the spans are rendered in the $-X$ direction and said resulting number changing step is accomplished by truncating said resulting number to negative infinity.

4. The method defined in claim 1 wherein said adding one or more intensity values step is accomplished by producing a selected edge step intensity value and adding said selected edge step intensity value to the intensity of the first pixel in each span to calculate the intensity of the first pixel in the next span of the primitive.

5. The method defined in claim 1
wherein said one of said $X_1$ and $X_2$ step values and said X address of the first pixel in each span of the primitive include integer and fractional parts which, when the fractional parts are added, may produce a carry into the integer part; and
adjusting said next pixel intensity calculation for the first pixels of selected spans of the primitive depending upon the presence or absence of said carry.

6. The method defined in claim 5 wherein said adding one or more intensity values step is accomplished by
producing a selected edge step intensity value and a selected span step intensity value;
adding said selected edge step intensity value to the intensity of the first pixel in each span to calculate the intensity of the first pixel in the next span of the primitive; and
adding said selected span step intensity value, in addition to said selected edge step intensity value, to the intensity of the first pixel in each span of the primitive when a carry is present to accomplish said intensity calculation adjusting.

7. The method defined in claim 6 wherein said carry is present at alternate spans of the primitive.

8. The method defined in claim 6 wherein said edge step intensity value is produced by the product of X1 step truncated to negative infinity and dI/dX added to the product of Y Dir. and dI/dY,
where dI/dX and dI/dY are selected intensity increments in the X and Y directions, respectively, Y Dir. is positive if the primitive is rendered in the $+Y$ direction and negative if rendered in the $-Y$ direction.

9. The method defined in claim 1 and including the additional steps of storing as memory data the results of the X and Y address calculations and the intensity calculations for the pixels in each span of the primitive; and
controlling a graphics display in accordance with said memory data.

10. The method defined in claim 1 wherein the number of pixels in each span is determined by subtracting the X addresses of the first and last pixels in that span.

11. Apparatus for rendering a smooth-shaded graphics primitive composed of a series extending in a Y direction of pixel spans which extend in a X direction between opposite beginning and trailing edges of the primitive, the permitted pixel locations being spaced from each other in the X direction by a selected distance dX and in the Y direction by a selected distance dY, said apparatus comprising:
means for producing selected X and Y addresses of the first and last pixels in the beginning span of the primitive and a selected number indicating the number of spans in the primitive;
means for producing XI step and X2 step values (dX/dY) indicating the slopes of said beginning and trailing edges, respectively;
means for producing a beginning intensity value for the first pixel in the beginning span of the primitive;
means for adding the selected distance dX to the X address of each pixel in each span to determine the X address of the next pixel in that span;
means for adding one of said XI and X2 step values to the X address of the first pixel in each span of the primitive and changing the resulting number to the nearest pixel location within said edges of the primitive to calculate the X address of the first pixel in the next span of the trapezoid;
means for adding the other of said X1 and X2 step values to the X address of the last pixel in each span of the primitive to calculate the X address of the last pixel in the next span of the primitive;
means for determining the number of pixels in each span from the X addresses of the first and last pixels in each span and after the determined number of pixels has been rendered, adding the selected distance dY to the Y address of each span to calculate the Y address of the next span of the primitive until the selected number of spans has been rendered; and
means for adding one or more intensity values to said beginning intensity value to calculate the intensity value for a next pixel to be rendered in a given row, and means for successively adding a selected one of said intensity values to said next pixel rendered to calculate the intensity value of a successive pixel to be rendered in that row so as to produce a substantially constant intensity change from pixel to pixel in any given direction through the primitive.

12. The apparatus defined in claim 11
wherein the spans are rendered in the $+X$ direction and said changing means include means for truncating said resulting number to negative infinity; and
further including means for incrementing said resulting number by said selected distance dX.

13. The apparatus defined in claim 11 wherein the spans are rendered in the $-X$ direction and said changing means include means for truncating said resulting number to negative infinity.

14. The apparatus defined in claim 11 wherein said means for adding one or more intensity values include means for producing a selected edge step intensity value; and means for adding said selected edge step intensity value to the intensity of the first pixel in each span to calculate the intensity of the first pixel in the next span of the primitive.

15. The apparatus defined in claim 11 wherein said one of said $X_1$ and $X_2$ step values and said X address of the first pixel in each span of the primitive include integer and fractional parts which, when the fractional parts are added, may produce a carry into the integer part; and further including means for adjusting said next pixel intensity calculation for the first pixels of selected spans of the primitive depending upon the presence or absence of said carry.

16. The apparatus defined in claim 15 wherein said means for adding one or more intensity values include means for producing a selected edge step intensity value and a selected span step intensity value;

means for adding said selected edge step intensity value to the intensity of the first pixel in each span to calculate the intensity of the first pixel in the next span of the primitive; and means for adding said selected span step intensity value, in addition to said selected edge step intensity value, to the intensity of the first pixel in each span of the primitive when a said carry is present.

17. The apparatus defined in claim 16 wherein said carry is present at alternate spans of the primitive.

18. The apparatus defined in claim 11 and further including means for storing as memory data the results of the X and Y address calculations and the intensity calculations for the pixels in each span of the primitive; and means for controlling a graphics display in accordance with said memory data.

* * * * *